Sept. 17, 1968  L. LONNON  3,401,563
MEASUREMENT OF THE SURFACE LEVEL OF LIQUIDS
Filed Jan. 13, 1966  3 Sheets-Sheet 3
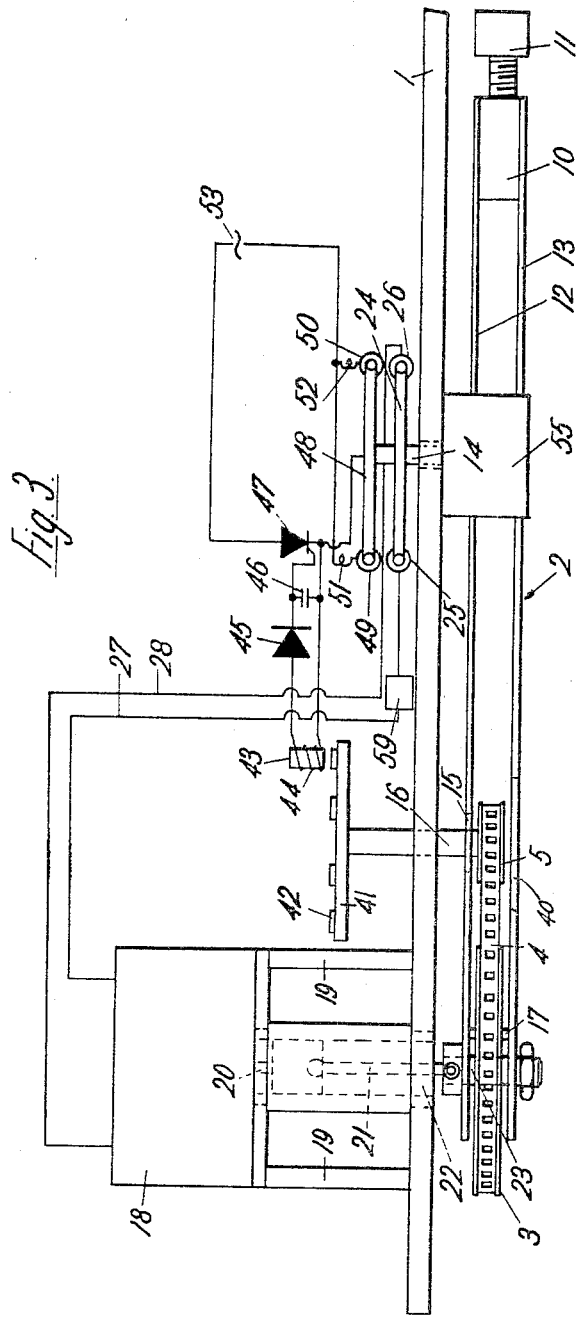
INVENTOR
Laurence Lonnon
BY Kenon Palmer
Stewart + Estabrook
ATTORNEYS

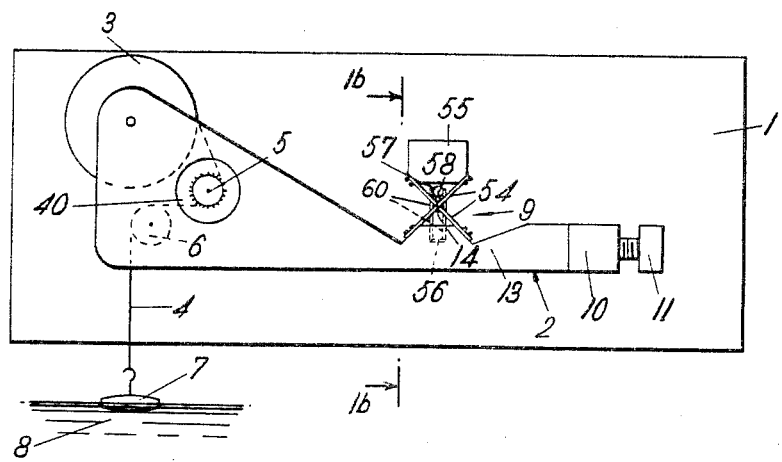

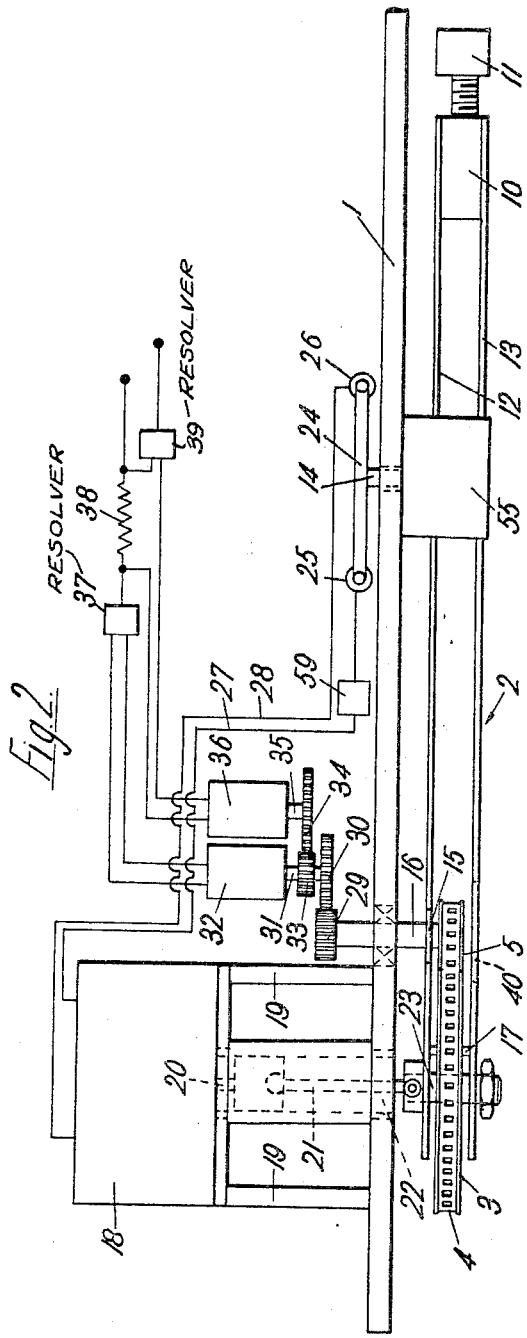

United States Patent Office 3,401,563
Patented Sept. 17, 1968

3,401,563
MEASUREMENT OF THE SURFACE LEVEL OF LIQUIDS
Lawrence Lonnon, Chiswick, London, England, assignor to Evershed & Vignoles Limited, London, England, a British company
Filed Jan. 13, 1966, Ser. No. 520,533
Claims priority, application Great Britain, Jan. 22, 1965, 2,975/65
11 Claims. (Cl. 73—313)

ABSTRACT OF THE DISCLOSURE

Apparatus for measuring the surface level of a liquid in a tank where a partially immersed displacer has means for suspending it including a winding member carried by a movable support member such as a pivoted balance beam. A constant restoring force applied to the movable support means tends to maintain it in a balanced position. Sensing means sense the movement of a support member from the balance position to control a motor which rotates the winding member in the direction to restore balance. As the entire suspension is effectively balanced against a constant restoring force, the weight of the unwound portion of the suspension will have a constant effect on the displacer.

---

This invention relates to apparatus for measuring the surface level of a liquid, for example, in a tank. One such apparatus has a partially immersed displacer, the vertical position of which is used to indicate the surface level. The displacer is connected by a suspension to a winding member. The effective weight of the displacer and the weight of the unwound portion of the suspension are balanced against a restoring force applied to the winding member in such a way that when this balancing arrangement is disturbed in one direction or the other by a change in the surface level with consequential change in upthrust on the displacer, then the winding member is turned so as to move the displacer and restore the balance. However such an apparatus suffers from the disadvantage that the length and hence the weight of the unwound portion of the suspension is dependent upon the surface level. When the level is low for example, a greater length of suspension will be unwound than when the level is high. Consequently the displacer will be lower with respect to the surface level in order to increase the upthrust so as to equalise the increase in weight of the suspension and keep the arrangement balanced. Hence the depth of immersion of the displacer in the liquid is not constant and thus the displacer does not give an accurate indication of the surface level. Thus errors will be present in any measurement unless the apparatus is calibrated for every level.

According to the present invention this disadvantage is eliminated in that, in the balancing arrangement, the effective weight of the partially immersed displacer, the suspension and the winding mechanism is balanced against the constant restoring force. A change of surface level, which disturbs the state of balance, results in movement of the balancing arrangement in one direction or the other which causes the winding member to be automatically turned so as to restore balance. As it is the whole of the suspension which is weighed the errors present in the previously described apparatus cannot occur. For example, movement of the balancing arrangement may actuate either of two electrical switches so as to energize an electric motor connected to turn the winding member in the direction which restores balance. The motor is preferably not mounted on the balancing arrangement but mounted rigidly and connected to the winding member by means of a universal coupling. In this way the weight of the balancing arrangement is kept small so that the constant restoring force and the moment of inertia of the balancing arrangement are also small. Thus the balancing arrangement will move quickly when the balance is disturbed thus causing the apparatus to operate to restore balance quickly. The constant restoring force is preferably provided by a counterweight which may be mounted at one end of a pivoted beam carrying the winding member at the other end.

As the depth of immersion of the displacer is the same whatever the surface level, the level may be measured directly by the suspension. The latter preferably engages with a cooperating member in such a way that vertical movement of the displacer causes rotation of the member. Preferably the suspension is a perforated tape and the cooperating member is a sprocket, the teeth of which engage with the perforations of the tape. In this way any possibility of slipping which would clearly cause errors is avoided.

Rotation of the cooperating member can be converted into an electrical pulse train or other form suitable for remote indicating applications. As the apparatus is of simple design, it is particularly suited for such applications as it requires little maintenance. In particular the apparatus has no gearing except that required for the integral motor speed reduction and the accurate wire drum which is required in some types of present measuring apparatus is eliminated.

By way of example apparatus in accordance with the invention will now be described in more detail with reference to the accompanying drawings in which:

FIGURE 1a is a diagrammatic elevation of the apparatus;

FIGURE 1b is a section on the lines 1b—1b of FIGURE 1a;

FIGURE 2 is a plan view on a larger scale of one form of the apparatus; and

FIGURE 3 is a plan view on the same scale as FIGURE 2 of an alternative form of the apparatus.

Referring to FIGURES 1 and 2 the apparatus includes a supporting plate 1 to which is pivoted a beam indicated generally as 2. The beam is formed of two spaced plates 12 and 13 and is arranged to transmit pivoting movement by means of a flexure pivot 9 to a shaft 14 journalled in the plate 1. The flexure pivot 9 is formed of four ligaments indicated at 54 which are disposed in pairs to form an X. They are attached at one end to a projection 55 on the plate 1 and at the other end to the plates 12 and 13 and are thus kept in tension by the weight of the beam and associated equipment. A pair of leaf springs 60 are attached to the plate 12 at 56 and extend upwards to engage with a pin 57 carried at the end of a crank arm 58 which is secured to the shaft 14. When the beam is horizontal, the shaft 14 is in line with the pivot point, that is to say the point where the ligaments 54 cross to form the X. The beam is thus free to pivot about the flexure pivot 9 and this pivoting movement is transmitted to the shaft 14 which hence turns in the same direction in sympathy. The flexure pivot applies a slight bias to the beam so that it tends to take up a horizontal position as shown in FIGURE 1.

The beam carries a winding member in the form of a 4″ diameter drum 3 secured to a shaft 23 which is journalled in the two plates 12 and 13. The beam also carries in a similar manner a guide roller 6 secured to a shaft 17. The plate 1 has journalled in it a shaft 16 which carries a sprocket 5. The inner plate 12 of the beam has a vertically extending slot 15 through which the shaft 16 passes, the slot allowing the beam to pivot through a small angle about the pivot 9. The outer plate 13 of the beam is formed with a circular aperture 40 through which the sprocket 5 is visible.

A suspension in the form of a 0.002" thick perforated steel tape 4 is wound around the drum 3 in a shallow groove after passing around the sprocket 5, the teeth of which engage with the tape perforations, and the guide roller 6. The tape 4 is attached to a partially immersed displacer 7 which moves vertically in accordance with changes in the surface level of a liquid 8. The sprocket 5 and roller 6 are located so that the horizontal run of tape between them is in line with the pivot point so as to avoid a turning moment. The use of a thin suspension avoids wide variations in the displacer speed when the apparatus is operating. For instance the present apparatus has a range of 60 ft. which with the 4" diameter drum only gives a tape build-up in the groove on the drum of approximately 0.120".

A counterweight 10 is carried by the beam to balance it about the pivot 9. Small adjustments are made by an adjustment screw 11 which enables a small variation in the restoring force to be made.

When balanced, the effective weight of the displacer 7 (the tension it applies to the tape 4), the tape 4 and the winding mechanism (winding drum 3, that part of the beam 2 to the left of the pivot 9 and the guide roller 6) is balanced against the constant restoring force provided by the counterweight 10, the adjustment screw 11 and that part of the beam 2 to the right of the pivot 9. This balancing arrangement will be maintained in balance until the surface level changes.

A reversible electric motor and associated reduction gearing is mounted in a housing 18 and is rigidly attached to the plate 1 by the brackets 19. The motor drives a shaft 20 which is connected by a universal coupling 21 passing through a vertical slot 22 (to allow the beam to pivot) in the plate 1 to the shaft 23 which carries the winding drum 3. The motor is energised through a reversing switch which is operated by the shaft 14. The latter has secured to it a contact arm 24 which can make contact with either contact 25 or contact 26 depending on the angular position of the shaft 14 or in other words on the direction in which balance of the beam 2 is disturbed. The contacts 25 and 26 are connected by respective leads 27 and 28 to the motor. The lead 27 includes a surf damping unit 59 which prevents oscillation of the apparatus which would otherwise occur if the liquid 8 was turbulent, for instance if the surface was disturbed by air currents. This unit 59 incorporates a time delay circuit which is such that the motor circuit is not completed unless the contact 25 are 26 is completed for more than a predetermined short period. Hence quick oscillations of the beam will not cause the operation of the apparatus.

When balanced the contact arm 24 does not contact either the contact 25 or the contact 26 and the motor is therefore not energised. If the surface level changes, the state of balance will be disturbed and the beam will pivot slightly in either a clockwise or anticlockwise direction as viewed in FIGURE 1 depending on whether the surface level rises or falls. This causes the contact arm to similarly pivot and make contact with either the contact 25 or the contact 26. The motor is thus energised and rotates the winding drum 3. If for instance the surface level rises then the beam will pivot slightly in a clockwise direction and the contact 26 will close. The motor connections are such that the motor then turns the winding drum 3 in an anticlockwise direction. This winds up some of the tape 4 and consequently the beam 2 turns slightly in an anticlockwise direction until the contact 26 opens whereupon the motor stops with the beam balanced in the horizontal position. If the surface level drops the apparatus operates in a similar manner only this time the contact 25 is closed and the drum 3 unwinds tape. In both cases the beam is brought back to the horizontal position at which it is balanced. The components of the balancing arrangement are made as light as possible to reduce the response time on sensing a change in level. For instance the plates 12 and 13 can be formed with holes to reduce their weight.

When in the balance position the upward force applied to the displacer 7 is constant and independent of the length of tape payed out, that is to say it is independent of the surface level. This is because the upward force is the difference between the constant restoring force (the counterweight 10, etc.), and the weight of the winding mechanism and entire tape. The entire tape is always weighed whatever the level and hence the upward force must remain constant. Accordingly the datum level on the displacer 7 with respect to the surface level remains constant and hence the tape 4 can be used to give an exact indication of the surface level. In the present arrangement the tape perforations engage with the teeth of a sprocket 5 so that changes in surface level are converted into rotary motion with a direction dependent on whether the level is rising or dropping. This rotary motion can be used to operate level indicating devices and two versions of arrangements for operating such devices are shown in FIGURES 2 and 3 respectively. These figures are similar except for the level indicating arrangements.

Referring first to FIGURE 2 the shaft 16 which carries the sprocket 5 also carries a gear wheel 29 which meshes with a gear wheel 30 secured to the shaft 31 of a continuous rotation potentiometer 32. In the present example the gear ratio is such that the shaft 31 is rotated once for every foot change of level and the total range of level of the apparatus is 60 feet. The shaft 31 also carries a gear wheel 33 which meshes with a gear wheel 34 producing a 6 to 1 speed reduction. The gear wheel 34 is secured to the shaft 35 of a ten turn helical potentiometer 36. Accordingly the resistance of the potentiometer 36 is directly dependent on the surface level over the whole range.

The resistance of the potentiometer 32 is measured by a resistance resolver unit 37, the output of which is applied across a resistor 38. The voltage developed across this resistor is applied as negative feedback to the input of a resistance resolver unit 39 for the potentiometer 36.

As the surface level rises the resistance of the potentiometer 36 increases linearly. The resistance of the potentiometer 32 increases from zero to its maximum value over one revolution of the shaft 31. Accordingly a voltage signal is obtained across the resistor 38 which increases from zero to a certain predetermined value over each revolution. This voltage increase is arranged to be of the opposite sign and equal in magnitude to the voltage increase caused by the shaft 35 of the potentiometer 36 rotating through one-sixth of a turn. Accordingly as the shaft 35 rotates, the output of the resolver unit 39 will increase in steps at the end of each one-sixth of a turn rotation or, in other words, the output will increase by a step each time the level rises by a foot. The output from the resolver unit 37, however, increases linearly during each foot of level increase then instantaneously returning to zero. This output can therefore be connected to an indicator calibrated in inches and tenths of an inch while the output from the resolver unit 39 can be connected to a feet indicator. The indicators may for instance be of the moving coil type or alternatively the analogue signals from the resolvers 37 and 39 can be converted into digital form and then be read on a digital indicator or fed to a data logger or computer. If a number of measuring apparatuses are in use then only one pair of resolvers is needed as they can be switched in turn to the particular apparatus measuring the surface level which it is required to know. Either a variable resistance output or a variable voltage output can be given using this method.

Referring now to FIGURE 3 the shaft 16 in this form of the apparatus carries a disc 41 studded with magnetic pole pieces 42 around its perimeter. The pole pieces cooperate with a soft iron core 43 around which is wound a coil 44. A diode 45 in series with a capacitor 46 is connected across the coil 44 with the positive terminal of the capacitor 46 connected to the gate terminal and the negative to the cathode terminal of a silicon controlled rectifier 47. The shaft 14 is provided with a second contact arm 48 which is arranged to contact either contact 49 or contact 50 slightly in advance of the closing of the appropriate contact 25 or 26. The cathode of the SCR 47 is conected to the contact arm 48. Each contact 49 and 50 is connected through the respective operating coils 51 and 52 of a bidirectional counter to an A.C. supply 53.

In this apparatus when the surface level changes either the contact 49 or the contact 50 is closed thus selecting either the coil 51 or the coil 52. Rotation of the disc 41 generates a pulse current in the coil 44 which develops a voltage across the capacitor. The SCR 47 conducts as the pole pieces 42 pass the core 43 thus completing the circuit and energising the selected coil 51 or 52 to cause the counter to register the change of level. The capacitor 46 serves to store oscillatory signals and to ensure that the SCR conducts for a sufficient time to operate the selected counter coil. The coils are arranged so that on operation they add and subtract respectively to the total shown on the counter so that an exact indication of the precise surface level is always given.

I claim:

1. Apparatus for measuring the surface level of a liquid, comprising:
    a displacer;
    a winding member;
    a suspension connecting said displacer to said winding member;
    a movable support member carrying said winding member;
    means for applying a constant force to said support member tending to maintain said support member in a balance position balanced by a force resulting from effective weight of said displacer, weight of said suspension, weight of said winding member and weight of said support member;
    sensing means for sensing movement of said support member from said balance position; and
    a motor connected to said sensing means for rotating said winding member in that direction which restores said support member to said balance position.

2. Apparatus according to claim 1 in which said support member is a beam extending in a substantially horizontal direction and mounted to rock about a substantially horizontal axis spaced from ends of said beam and transverse to longitudinal axis of said beam.

3. Apparatus according to claim 2 in which said winding member is carried adjacent one end of said beam and the other end of said beam is weighted to produce said constant force.

4. Apparatus according to claim 1 in which said motor is mounted separately from said support member and has a drive including a universal coupling connecting said winding member to said motor for rotation thereby.

5. Apparatus for measuring the surface level of a liquid, comprising:
    a displacer;
    a winding member;
    a suspension connecting said displacer to said winding member;
    a beam extending in a substantially horizontal direction and mounted to rock about a substantially horizontal axis spaced from ends of said beam and transverse to longitudinal axis of said beam, said winding member being carried adjacent one end of said beam and the other end of said beam being weighted to produce a constant force tending to maintain said beam in a balance position balanced by a force resulting from effective weight of said displacer, weight of said suspension, weight of said winding member and weight of said beam;
    sensing means including electrical contacts controlled by said beam for sensing movement of said beam from said balance position; and
    an electrical circuit including a reversible electric motor connected to said contacts, said motor serving to rotate said winding member in that direction which restores said beam to said balance position.

6. Apparatus according to claim 5 including a rotatably mounted member coupled to said suspension to be driven thereby so that on a change of surface level, corresponding movement of said suspension rotates said member which thereby provides an indication of said surface level.

7. Apparatus according to claim 6 in which said suspension is a perforated tape and said rotatably mounted member is a sprocket having teeth which engage with perforations in said tape.

8. Apparatus according to claim 6 including a transducer coupled to said rotatably mounted member for converting rotation therein into an electrical signal indicative of said surface level.

9. Apparatus according to claim 8 in which said transducer includes an electromagnetic device which on rotation of said rotatably mounted member produces a number of electrical pulses proportional to the angular rotation of said rotatably mounted member, a silicon controlled rectifier having a gate to which said pulses are applied, a bidirectional counter controlled by said rectifier, and sensing means for sensing direction of rotation of said rotatably mounted member and thereby for causing said counter to count in an appropriate direction.

10. Apparatus according to claim 9 in which said sensing means includes electrical contacts controlled by said beam and which sense direction of movement of said beam from said balance position.

11. Apparatus according to claim 8 in which said transducer includes a continuous rotation potentiometer rotated by said rotatably mounted member, a second potentiometer also rotated by said rotatably mounted member at a lower speed than said continuous rotation potenitometer, means whereby a first electrical signal proportional to resistance of said continuous rotation potentiometer is applied in opposition to a second electrical signal proportional to resistance of said second potentiometer to thereby produce a stepped output signal, a step occurring each time resistance of said continuous rotation potentiometer changes abruptly, a multiple units counter measuring said second signal and hence multiple units of height of said surface level, and a units counter measuring said first signal and hence units of height of said surface level.

References Cited

UNITED STATES PATENTS

| | | | |
|---|---|---|---|
| 1,611,407 | 12/1926 | Berg | 33—126.6 |
| 2,567,823 | 9/1951 | Needham | 73—313 |
| 2,704,401 | 3/1955 | Mohr et al. | 33—126.6 |
| 2,736,008 | 2/1956 | Miller | 73—313 X |
| 3,140,614 | 7/1964 | Willis | 73—410 |
| 3,140,609 | 7/1964 | Mayes | 73—321 |

DAVID SCHONBERG, *Primary Examiner.*

D. M. YASICH, *Assistant Examiner.*